United States Patent [19]
Berland et al.

[11] 3,738,583
[45] June 12, 1973

[54] APPARATUS FOR MIXING, BLENDING, LIQUIFYING OR CHOPPING

[76] Inventors: Abram Berland; Moises Berland, both of Rua Barro de Tibagi, 258-Bom Retiro, Sao Paulo, Brazil

[22] Filed: Feb. 22, 1971

[21] Appl. No.: 117,427

[52] U.S. Cl. .............................. 241/46.17, 259/108
[51] Int. Cl. .............................. A47j 43, B02c 18/12
[58] Field of Search............... 146/68 A, 68 R, 106; 259/108, DIG. 25, DIG 30

[56] References Cited
UNITED STATES PATENTS
| | | | |
|---|---|---|---|
| 3,135,500 | 6/1964 | Perrinjaquet | 146/68 A X |
| 2,226,372 | 12/1940 | Cravaritis | 146/68 A |
| 3,540,234 | 11/1968 | Raymond | 146/68 A |

Primary Examiner—Willie G. Abercrombie
Attorney—Woodhams, Blanchard & Flynn

[57] ABSTRACT

An improved apparatus for liquefying, mixing and blending material, particularly foods, including a cup-shaped receptacle adapted to be mounted on a base containing a drive motor therein. The bottom wall of the receptacle has an opening therein, and a drive shaft extends through the opening and is sealingly engaged with the bottom wall. The lower end of the drive shaft is adapted to be releasably coupled to the drive motor. The upper end of the shaft has a blade set non-rotatably but removably connected thereto and positioned within the interior of the receptacle. The blade set includes two vertically spaced blades connected by pins. The drive shaft has radially extending projections adapted to drivingly engage the connecting pins of the blade set.

8 Claims, 13 Drawing Figures

Patented June 12, 1973

INVENTORS
ABRAM BERLAND
MOISES BERLAND
BY Woodhams, Blanchard & Flynn
ATTORNEYS

Patented June 12, 1973

INVENTORS
ABRAM BERLAND
MOISES BERLAND

BY Woodhams, Blanchard & Flynn
ATTORNEYS

INVENTORS
ABRAM BERLAND
MOISES BERLAND
BY Woodhams, Blanchard & Flynn
ATTORNEYS

IMPROVEMENTS INTRODUCED IN LIQUIFIERS

FIELD OF THE INVENTION

This invention relates to an improved apparatus for liquefying, blending and mixing materials, particularly foods.

It is an object of this invention to thus provide a liquefier or mixing apparatus which results in improved usage and which facilitates cleaning thereof while avoiding breaking or leaking of the material receptacle.

DETAILED DESCRIPTION

Figures 1, 2:
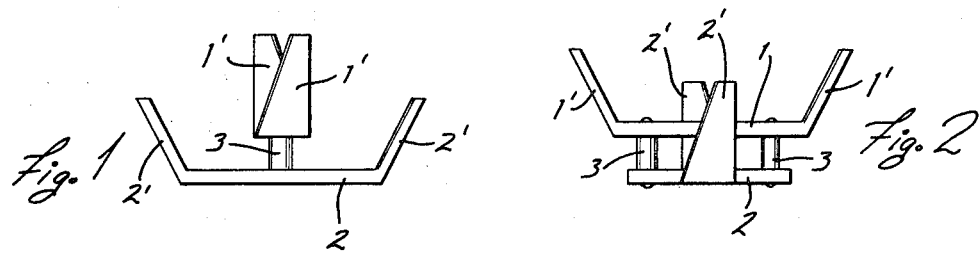
FIG. 1 is a side elevational view of the blade assembly constructed according to the present invention.
FIG. 2 is a front elevational view of the blade assembly illustrated in FIG. 1.
Figures 3, 4:
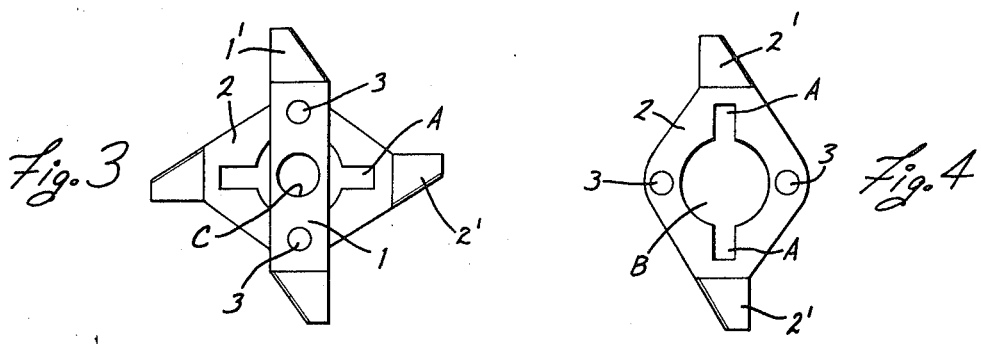
FIG. 3 is a top view of the blade assembly as illustrated in FIG. 1.
FIG. 4 is a top view of the blade assembly illustrated in FIG. 2 but with the upper knife removed.

FIGS. 1-4 illustrate therein a blade assembly which includes upper and lower knife members 1 and 2, respectively, fixedly interconnected by a pair of pins or pegs 3 which are disposed on diametrically opposite sides of the rotational axis of the blade assembly. The pegs 3 are suitably secured to the knives in a conventional manner, such as by being riveted or soldered. Each of the knives 1 and 2 includes substantially parallel base portions which are maintained a predetermined vertical distance apart by the intermediate pegs 3, with the opposite ends of each base portion having suitable upwardly directed blades 1' and 2' connected thereto. As illustrated in FIGS. 1-3, the upper knife 1 is disposed substantially transverse to the lower knife 2.

The lower knife has a center hole B extending therethrough and the upper knife 1 has a further center hole C extending therethrough. The center holes B and C are coaxially aligned, with the center hole B being substantially larger in diameter than the center hole C. The lower knife 2 also has a pair of elongated slots A which extend radially outwardly from the diametrically opposite sides of the center hole B, the slots A being substantially angularly spaced from the pegs 3.

Figure 5:
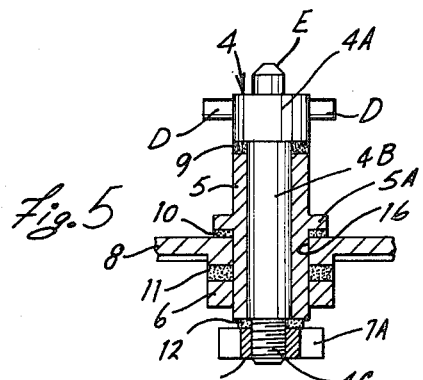
FIG. 5 is a fragmentary sectional elevational view of the drive assembly.
Figure 13:
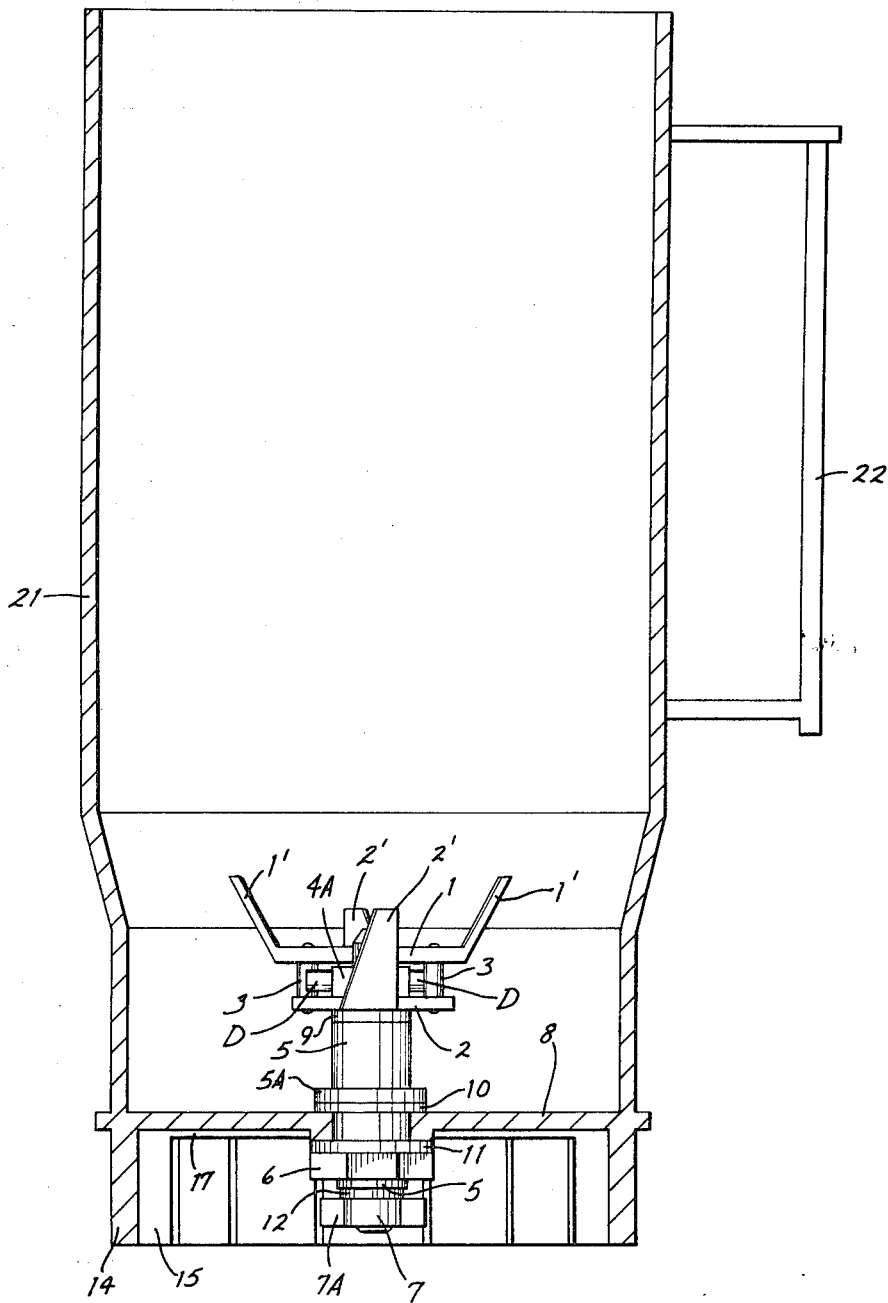
FIG. 13 is a central, sectional, elevational view of the cup-shaped receptacle having the drive and blade assemblies mounted thereon.

FIG. 5 illustrates therein the drive assembly for the blade assembly. The drive assembly specifically includes a drive shaft 4 which includes a main shaft portion 4A from which extends a pair of radially directed pegs D. A further peg E extends upwardly from the main shaft portion 4A. The drive shaft 4 also includes an intermediate shaft portion 4B of reduced diameter which is rotatably disposed within a sleeve or bushing 5, which bushing has an annularly outwardly extending flange 5A fixedly secured thereto. The bushing 5 is adapted to be disposed within an opening 16 formed in the bottom wall 8 of the cup-like receptacle 21 (FIG. 13), with the bushing flange 5A being seated on the bottom wall 8 by means of an intermediate seal or packing ring 10. The lower end of the shaft 4 is provided with a threaded portion 4C which has threadably engaged thereon a winged nut 7 for axially retaining the drive shaft 4 within the sleeve 5. Suitable seal or packing rings 9 and 12 are provided adjacent the opposite ends of the sleeve 5 when the shaft and sleeve are assembled. The lower end of the sleeve 5 is externally threaded and has a threaded nut 6 disposed thereon, and a further seal or packing ring 11 is disposed between the bottom cup wall 8 and the nut 6, whereby tightening of the nut 6 causes the bottom wall 8 to be securely retained between the nut 6 and the flange 5A. This thus fixedly and sealingly secures the sleeve 5 and the shaft 4 relative to the bottom wall 8 of the cup-like receptacle 21.

Figure 6:
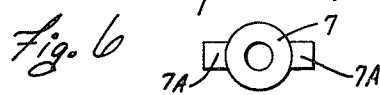
FIG. 6 is a bottom view of the driven wing nut which is attached to the lower end of the drive shaft.
Figure 7:
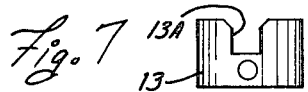
FIG. 7 is a side elevational view of a drive sleeve provided on the base and adapted to be releasably connected to the driven wing nut.
Figure 8:
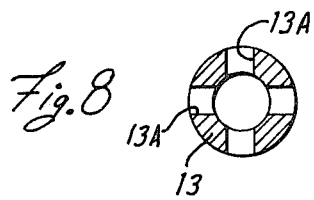
FIG. 8 is a top view of the drive sleeve illustrated in FIG. 7.
Figure 9:
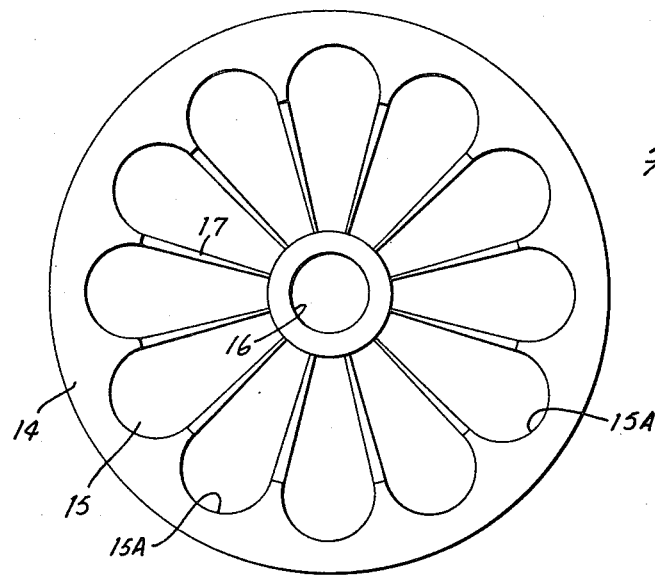
FIG. 9 is a bottom view of the material receiving cup or receptacle.
Figure 10:
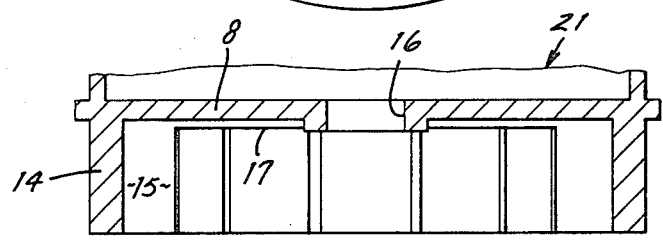
FIG. 10 is a fragmentary, elevational sectional view of the lower part of the receptacle.
Figure 11:
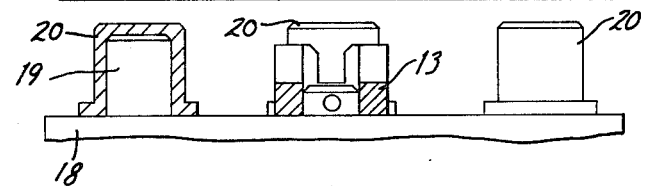
FIG. 11 is a fragmentary elevational view of the upper part of the base.

The winged nut 7, as illustrated in FIG. 6, specifically includes an internally threaded annular portion which is adapted to threadably engage the shaft 4C, and further includes a pair of diametrically opposite wings or projections 7A which extend radially in diametrically opposite directions. The projections 7A are adapted to be disposed within the radial slots 13A which are formed in the upper axial end of the driving sleeve 13.

Figure 12:
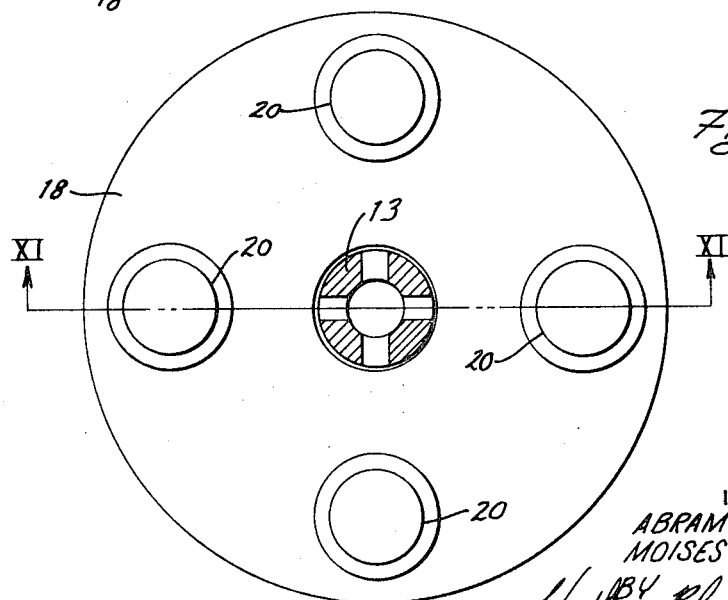
FIG. 12 is a top view of the base illustrated in FIG. 11.

The driving sleeve 13 is, as illustrated in FIG. 12, provided on the support base 18, which support base has a motor (not shown) mounted in the interior of, with the motor having a substantially vertically extending drive shaft extending upwardly for connection to the driving sleeve 13. The driving sleeve 13 is disposed centrally of and directly above the uppermost wall of the base 18 for enabling the driving sleeve 13 to be disposed in driving engagement with the winged nut 7 when the receptacle 21 is mounted on the base 18.

The cup-like receptacle 21 includes a substantially cylindrical sidewall extending upwardly from the bottom wall 8, which sidewall has a suitable handle 22 secured thereto. The receptacle 21 also has an annular wall or skirt portion 14 which extends downwardly from the bottom wall 8, which skirt portion 14 in conjunction with the plurality of radially extending strengthening ribs 17 define a plurality of downwardly directed, radially extending, elongated recesses 15, which recesses adjacent their radially outer ends have a partial cylindrical configuration 15A.

The cup 21, and particularly the downwardly extending skirt portion 14, is adapted to be seated on the upper wall of the base portion 18, with the cup being securely retained thereon by suitable axial projections formed on the upper wall of the base portion, which projections are adapted to snugly extend into the enlarged radial outer ends of the recesses 15, The projections on the base portion 18 specifically include radially extending pegs 19 which preferably have a rubber or plastic sleeve 20 disposed thereover for enabling the projections to be snugly received within the outer radial ends of the recesses 15.

ASSEMBLY AND OPERATION

In assembling the device, the sleeve 5 is passed downwardly through the opening 16 and the nut 6 is then tightened on the sleeve to cause the bottom wall 8 of the cup to be securely tightly clamped between the sleeve flange 5A and the nut 6. The packing rings 10 and 11 are disposed on opposite sides of the bottom wall 8 to provide a tight seal and to prevent damage to the cup. The shaft 4, with the packing ring 9 thereon, is then inserted into the sleeve 5 so that the upper end of the shaft is disposed within the interior of the cup-shaped receptacle. The packing ring 12 is then disposed over the lower end of the shaft and the winged nut 7 is threadably engaged on the lower shaft portion 4C to snugly axially secure the shaft 4 within the sleeve 5.

The blade assembly is then axially positioned on the shaft 4 by causing the drive projections D to align with the slots A, whereupon the knife blade assembly is moved axially downwardly onto the shaft so that the peg E extends into the center opening C, the shaft portion 4A extends into the center opening B, and the projections D pass through the slots A. The blade assembly will be moved downwardly until the upper end of the shaft portion 4A is disposed in engagement with the lower surface of the center base portion of the upper knife 1. When in this position, the projections D will be disposed between the base portions of the blades 1 and 2, whereupon the blade assembly is then manually twisted or angularly moved relative to the shaft to cause the pegs 3 thereon to be moved into abutting engagement with the drive projections D, thus permitting the knife assembly to be rotatably driven with the shaft 4.

The assembled receptacle 21 can then be disposed on the base 18 by causing the covered projections 19 to extend into the recesses 15, with the wings 7A on the drive nut 7 extending into one of the diametrically opposite pair of slots 13A formed in the driving sleeve 13.

During operation, the motor disposed in the base portion 18 is energized causing rotation of the sleeve 13, which transmits driving torque to the winged nut 7, which in turn causes rotation of the shaft 4. Rotation of shaft 4 causes the radial projection D to abut the pegs 3, thereby causing a corresponding rotation of the blade assembly.

The structure of the present invention, as described above, is advantageous because:

1. It permits the blade assembly to be easily mounted on or removed from the device without requiring complete removal of the drive shaft.

2. It permits the blade assembly to be easily cleaned since the complete blade assembly is totally removable as a unit, while at the same time the vertical separation between the knife members 1 and 2 also greatly facilitates the cleaning of the blade assembly and prevents food particles from becoming trapped.

3. The cup-like receptacle 21 can be desirably made in one-piece, and the drive assembly can be substantially permanently fixed to the cup, thereby greatly minimizing and substantially eliminating leakage.

4. There is no need to separate or remove the drive assembly from the lower wall of the cup since the blade assembly is separably removable as a unit from the drive shaft, whereupon the drive shaft and the related components of the drive assembly can be substantially fixedly connected to the bottom wall of the cup and thus the drive components need not be disassembled from the cup every time the blade assembly is removed for cleaning. This thus makes removal of the blade assembly for cleaning relatively easy, and also avoids possible breaking of the cup, which breaking is possible in situations where the complete drive assembly has to be removed.

5. The cup can be constructed easily and economically since the cup need not possess any threads or threaded fittings for enabling either the knife assembly or the drive assembly to be connected thereto.

6. The drive assembly, after the blade unit has been removed, has substantially circular and planar outer surfaces, thereby avoiding entrapment or collection of food and particles and thereby greatly facilitating cleaning.

The present invention thus relates to an apparatus which has desirable technical, hygienical and economical advantages.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which we claim an exclusive property or privilege are defined as follows:

1. An improved apparatus for mixing or liquefying materials, comprising a blade set having upper and lower blades joined together by pegs, the lower blade having a center hole therein and elongated slots extending radially therefrom, a drive shaft having radial projections adjacent the upper end thereof whereby the upper end of said shaft and said projection pass through said center hole and said slots, respectively, for enabling said projections to drivingly engage said pegs, a sleeve surrounding and rotatably supporting said shaft, a cup-like receptacle having an opening in the bottom wall thereof and mean for sealingly supporting said sleeve within said opening, a winged nut provided on the lower end of said shaft, and a base means having motor means associated therewith and disposed for driving engagement with the winged nut, the base means having projections thereon adapted to extend into radial and circular cylindrical reentrances formed on the bottom of said receptacle.

2. An apparatus, particularly for mixing, blending, liquefying or chopping, comprising:
 a base having motor means mounted thereon;
 a substantially cup-shaped receptacle adapted to be removably supported on said base so that said receptacle opens in an upward direction, said receptacle having an opening in the bottom wall thereof;
 guide means coacting between said base and the lower portion of said receptacle for enabling said receptacle to be nonrotatably but removably seated on said base;
 substantially vertically extending shaft means extending through said opening and having the upper end thereof disposed within the interior of said receptacle;

mounting means for rotatably but sealingly supporting said shaft means on said bottom wall of said receptacle;

blade means removably mounted on said shaft means adjacent the upper end thereof, said blade means being rotatably driven by said shaft means;

said blade means including upper and lower blade members vertically spaced a predetermined distance apart and pin means fixedly secured to and extending between said blade members;

connecting means coacting between the upper end of said shaft means and said blade means for enabling said blade means to be easily manually detached from said shaft means without requiring removal of said shaft means from said receptacle;

said connecting means includes a pin-and-slot type connection coacting between said blade means and the upper end of said shaft means for enabling said blade means to be initially axially pushed onto the end of said shaft means with said blade means being angularly displaceable a limited amount relative to said shaft means for causing said shaft means and said blade means to be disposed in rotatable driving engagement with one another and for preventing relative axial separation between said blade means and said shaft means; and disconnectible coupling means coacting between said motor means and the lower end of said shaft means for enabling said motor means to rotatably drive said shaft means.

3. An apparatus according to claim 2, wherein said lower blade member has a pair of elongated slots extending radially from said center opening, and the upper end of said shaft having a pair of radial projections thereon adapted to freely pass through said elongated slots for enabling said radial projections to be disposed in the space between the upper and lower blade members whereby said radial projections are adapted to abuttingly engage said pin means for rotating said blade means with said shaft means.

4. An apparatus according to claim 2, wherein said lower blade member has a center opening therethrough and at least one elongated slot extending radially therefrom, and the upper end of said shaft having a diameter approximately equal to the diameter of the center opening so as to freely rotatably extend therethrough, and the upper end of said shaft having at least one radial projection thereon adapted to freely pass through said elongated slot for enabling said radial projection to be disposed in the space between the upper and lower blade members whereby said radial projection is adapted to abuttingly engage said pin means for causing rotation of said blade means whenever said shaft means is rotated.

5. An apparatus according to claim 3, wherein said pin means are angularly displaced from said elongated slots, and wherein said upper blade member has a small guide opening therethrough and said shaft means has a small projection extending axially from the upper end thereof and adapted to extend through the guide opening in said upper blade member, whereby said upper blade member axially abuts against the upper axial end of said shaft means.

6. An apparatus according to claim 4, wherein said cup has an annular skirt portion extending downwardly from said bottom wall, said annular skirt defining a plurality of downwardly opening, angularly spaced, partially cylindrical recesses, and said base having a plurality of circumferentially spaced upwardly extending pegs formed on the upper surface thereof, said pegs being adapted to extend into said cylindrical recesses.

7. An apparatus according to claim 6, wherein said coupling means includes cooperating rotatable coupling members provided on the lower end of the shaft means and adjacent the upper end of the base, the coupling members having cooperating projections and grooves formed on the opposed axial end faces thereof for enabling said shaft means to be releasably but drivingly connected to said motor means.

8. An apparatus according to claim 4, wherein said upper and lower blade members each include an elongated planar base portion having an upwardly directed blade disposed adjacent the opposite ends thereof, the planar base portion of said upper and lower blades being disposed substantially parallel with one another but extending in substantially transverse directions.

* * * * *

UNITED STATES PATENT OFFICE
CERTIFICATE OF CORRECTION

Patent No. 3 738 583          Dated June 12, 1973

Inventor(s) Abram Berland and Moises Berland

It is certified that error appears in the above-identified patent and that said Letters Patent are hereby corrected as shown below:

On the Title page, column 1 thereof, between the lines designated "[21]" and "[52]", please insert the following: ---Foreign Application Priority Data
  February 23, 1970 Brazil . . . 216917----.

Signed and sealed this 27th day of November 1973.

(SEAL)
Attest:

EDWARD M. FLETCHER, JR.          RENE D. TEGTMEYER
Attesting Officer                 Acting Commissioner of Patents